United States Patent
Boeckle et al.

(10) Patent No.: US 7,733,796 B2
(45) Date of Patent: Jun. 8, 2010

(54) METHOD FOR THE MONITORING OF TRANSMISSIONS OF A BIDIRECTIONAL INTERFACE

(75) Inventors: Reinhard Boeckle, Maeder (AT); Carsten Strietzel, Feldkirch (AT); Reinhold Juen, Dornbirn (AT)

(73) Assignee: TridonicAtco GmbH & Co. KG, Dornbirn (AT)

(*) Notice: Subject to any disclaimer, the term of this patent is extended or adjusted under 35 U.S.C. 154(b) by 35 days.

(21) Appl. No.: 11/632,761

(22) PCT Filed: Jun. 21, 2005

(86) PCT No.: PCT/EP2005/006708

§ 371 (c)(1),
(2), (4) Date: Apr. 16, 2008

(87) PCT Pub. No.: WO2006/010416

PCT Pub. Date: Feb. 2, 2006

(65) Prior Publication Data

US 2009/0034420 A1 Feb. 5, 2009

(30) Foreign Application Priority Data

Jul. 23, 2004 (DE) ............... 10 2004 035 752

(51) Int. Cl.
*H04L 12/26* (2006.01)
(52) U.S. Cl. ..................... 370/252; 710/305
(58) Field of Classification Search ........... 370/389, 370/401, 252, 253, 255, 242, 230, 229, 232, 370/235, 332, 333, 241, 247, 251; 710/305
See application file for complete search history.

(56) References Cited

U.S. PATENT DOCUMENTS

| 6,628,653 B1 * | 9/2003 | Salim ..................... 370/389 |
| 2002/0099451 A1 | 7/2002 | Wang | |

FOREIGN PATENT DOCUMENTS

| DE | 3533278 | 3/1987 |
| GB | 2352150 | 1/2001 |
| WO | WO 02/082618 | 10/2002 |

OTHER PUBLICATIONS

International Search Report (German and English versions included) issued Mar. 17, 2006 in connection with International Application No. PCT/EP05/006708.
International Preliminary Report on Patentability (German and English versions included) issued Jan. 23, 2007 in connection with International Application No. PCT/EP05/006708.

* cited by examiner

*Primary Examiner*—Brenda Pham
(74) *Attorney, Agent, or Firm*—Marshall, Gerstein & Borun LLP

(57) ABSTRACT

A method for the monitoring of transmissions in a transmission branch of a bidirectional interface, which besides the transmission branch has a reception branch standing in connection with the transmission branch, has the steps a) sending out of information by means of the transmission branch, and b) evaluation of defined characteristics of the sent information via the reception branch of the same interface, whereby preferably depending on the evaluation of the sent information a setting of parameters of the transmission branch is effected, so that future information is sent out with use of these parameters.

22 Claims, 3 Drawing Sheets

METHOD FOR THE MONITORING OF TRANSMISSIONS OF A BIDIRECTIONAL INTERFACE

BACKGROUND OF THE INVENTION

The invention relates to a method for the monitoring of transmissions in a transmission branch of a bidirectional interface, in particular a digital bidirectional interface. Furthermore the invention relates to a lamp operating device for operating a lamp which has a corresponding bidirectional interface for data interchange.

RELATED TECHNOLOGY

Illumination systems for the illumination of large complexes or buildings, in which a plurality of luminaires arranged decentrally distributed are controlled by a central control unit, require the possibility of an extensive and reliable data interchange due to the variety of functions available. Whilst with earlier illumination systems it was known solely to transmit to the various luminaires switch-on and switch-off commands from a central control unit, modern illumination systems now provide the possibility of a data transfer from the luminaires to the central control unit, to transmit for example information with regard to the current operating state as well as fault information. The luminaires or lamp operating devices provided for the operation of such an illumination system correspondingly have a communication interface which is configured not only for data reception but also is able itself to send information on a bus line system.

The recently newly developed illumination systems or lamp operating devices work predominantly according to the so-called DALI standard. This DALI (Digital Addressable Lighting Interface) standard is a new simple and user-friendly interface for the realization of intelligent and functional light management systems. An substantial feature of the DALI standard is that the control commands and information are transmitted in a digital manner and correspondingly the various devices of the system have a bidirectional digital interface.

It is required in the transmission of digital control signals for light control that the bit lengths realized by the interfaces are kept within a certain range. For example according to the DALI standard there is permitted a tolerance range of only ±10% compared with the ideal bit length of 416 µsec. Since however the interfaces being used are normally constructed as economically as possible, and particularly the transmission branch responsible for the realization of the bit lengths is configured considerably more complexly and therefore more susceptible to component tolerances than the reception time is, there arises the problem that this requirement can be adhered to only with difficulty. Particularly temperature effects and intolerances of the components can lead in the worst case to the bit length realized by the transmission branch of an interface lying outside the permitted range, which would prevent a data interchange.

Similar problems also arise with non-digital bidirectional interfaces with which the signals distributed by the transmission branch also must likewise fulfil certain requirements, which—due to the trend towards cost saving mentioned above—can be complied with only with difficulty.

SUMMARY OF THE INVENTION

The invention is based correspondingly on the task of indicating a possibility of monitoring the signals or data transmitted by the transmission branch of a bidirectional interface in a simple way and if applicable carrying out required corrective actions. These improvements should, however, be made possible if possible without greater outlay and without an expansion of the interface hardware.

In accordance with a first aspect, the invention provides a method for the monitoring of transmissions in a transmission branch of a bidirectional interface, which along with the transmission branch also has a reception branch standing in connection with the transmission branch, that the information sent out by means of the transmission branch is received by the reception branch of the same interface and that defined characteristics of this sent information are evaluated.

According to a preferred embodiment of the invention, the less tolerance susceptible reception branch simultaneously reads the information transmitted from the transmission branch and checks this information for possible errors, wherein depending on the evaluation of the sent information certain parameters of the transmission branch can then be so set that future information is sent out under use of these parameters. If the interface is for example a digital interface, it can in particular be provided that the defined evaluated characteristics include the temporal bit length of the sent information, wherein if applicable a correction is carried out such that the bit length meets the corresponding requirements of the data interchange protocol.

In accordance with a first variant for a possibly required correction of the temporal bit length, the temporal bit length can be detected by starting a counter at a first flank and stopping the counter at the following flank, wherein then depending on the information gained the bit lengths of the following transmissions can be corrected by software. With a second variant the temporal bit length can be determined through the reception branch starting from the temporal difference between the input of the start flank of the bit in the interface and the passing on of this start flank on an attached bus, and correspondingly the required period for the bit length corrected. Both variants offer the advantage that for a correct adjustment of the bit length no additional hardware elements are required in the interface but instead all corrections can be carried out by software.

A second aspect of the invention relates to a method for the monitoring of the temporal bit length in a transmission branch of a bidirectional digital interface, which along with the transmission branch also has a reception branch standing in connection with the transmission branch, wherein upon sending out digital information by means of the transmission branch via the reception branch of the interface the temporal bit lengths of the sent information are evaluated and in advantageous manner a correction of the bit length is carried out if applicable.

Further, the invention relates to a bidirectional interface which has a transmission branch for the sending out of signals via a bus as well as a reception branch for receiving signals from the bus, wherein the reception branch is so connected with the transmission branch that a signal of sent out by the transmission branch can be read via the reception branch and furthermore a control unit is provided which reads signals sent out by the transmission branch via the reception branch. The control unit is preferably configured to set parameters of the transmission branch depending on the result of the evaluation, whereby in the event that a digital interface is involved in turn the defined evaluated characteristics preferably include the temporal bit length of the sent information.

Finally, a further aspect of the invention relates also to a bidirectional digital interface with a transmission branch for the sending of signals via a bus as well as a reception branch for receiving signals from the bus, wherein the reception branch is so connected with the transmission branch that signals sent out by the transmission branch are read via the reception branch, and wherein further there is provided a control unit which evaluates the temporal bit length of signals sent out via the transmission branch and read via the reception branch and depending on the result of the evaluation sets the bit length of the transmission branch by software, when the evaluation shows over a defined time period a deviation from a desired value beyond a permitted tolerance.

BRIEF DESCRIPTION OF THE DRAWINGS

Below, the invention is explained in more detail with reference to the accompanying drawings. There is shown.

DETAILED DESCRIPTION

Figure 1:
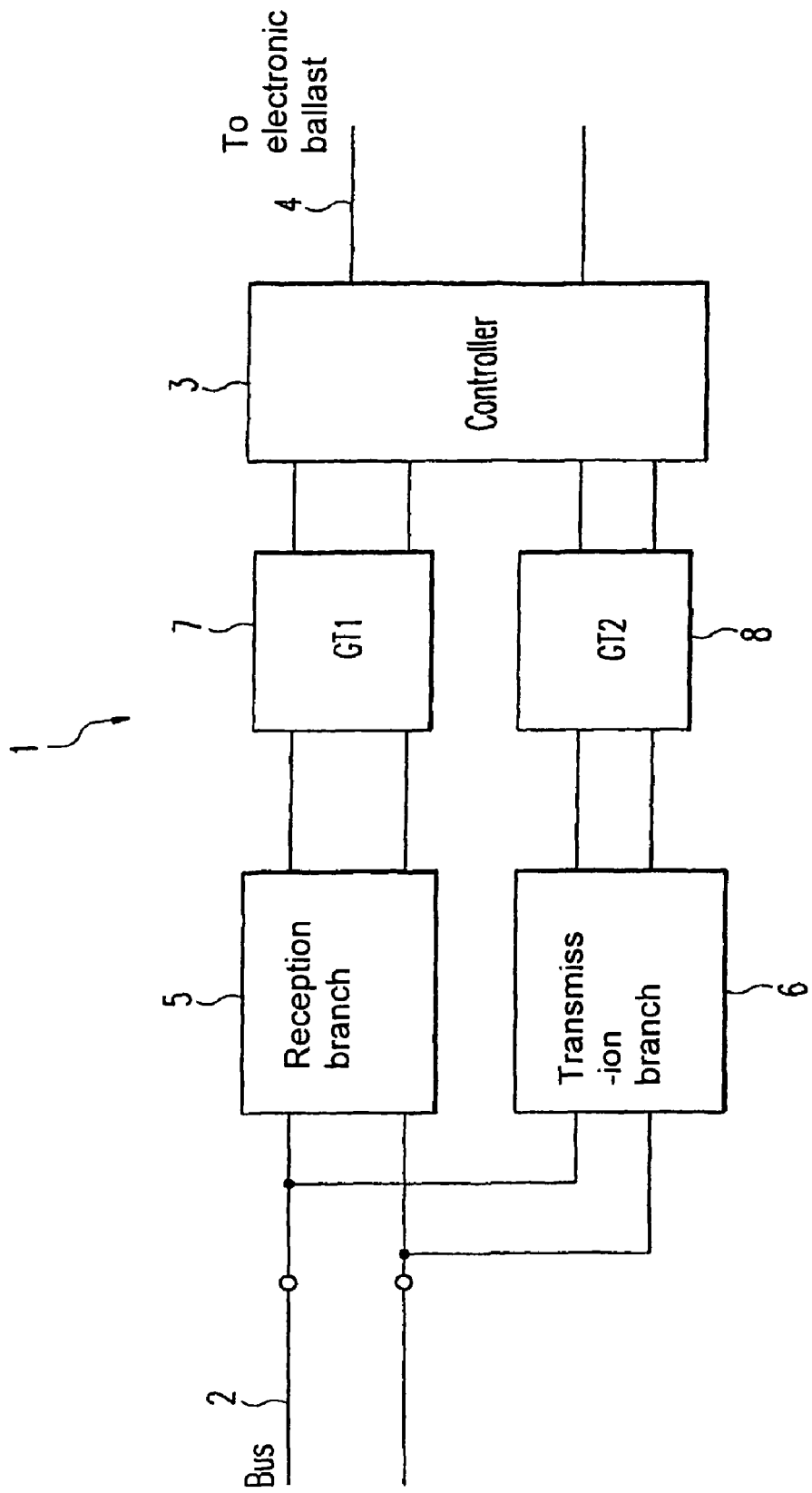
FIG. 1 schematically, the construction of a bidirectional interface in accordance with the invention.

Firstly FIG. 1 shows generally the construction of a bidirectional interface 1 which is configured for the reception and for the transmission of data via the two lines of a bus line system 2. The construction of this interface 1 corresponds substantially to the classic construction of bidirectional interfaces since the measures mentioned above according to the invention are primarily of software-related nature are and do not require use of additional hardware components.

A component of the interface 1 is correspondingly a controller 3 which is responsible for the data reception and the data transmission and is in connection with a device to be controlled via output lines 4. In the case of the present exemplary embodiment it is to be assumed that the device to be controlled is a device for operating illumination means, in particular for a lamp as for example with a gas discharge lamp, LEDs or halogen illumination element. An electronic ballast (EVG) is preferred for gas discharge lamps.

On the one hand, further components of the bidirectional interface are a reception branch 5 which is responsible for receiving information on the bus lines 2 and is connected to the controller 3 via a first element 7 for electrical decoupling. For the transmission of information from the controller 3 to the bus lines 2 there is furthermore provided a transmission branch 6 which is connected to the controller 3 via another element 8 for electrical decoupling.

Figure 2:
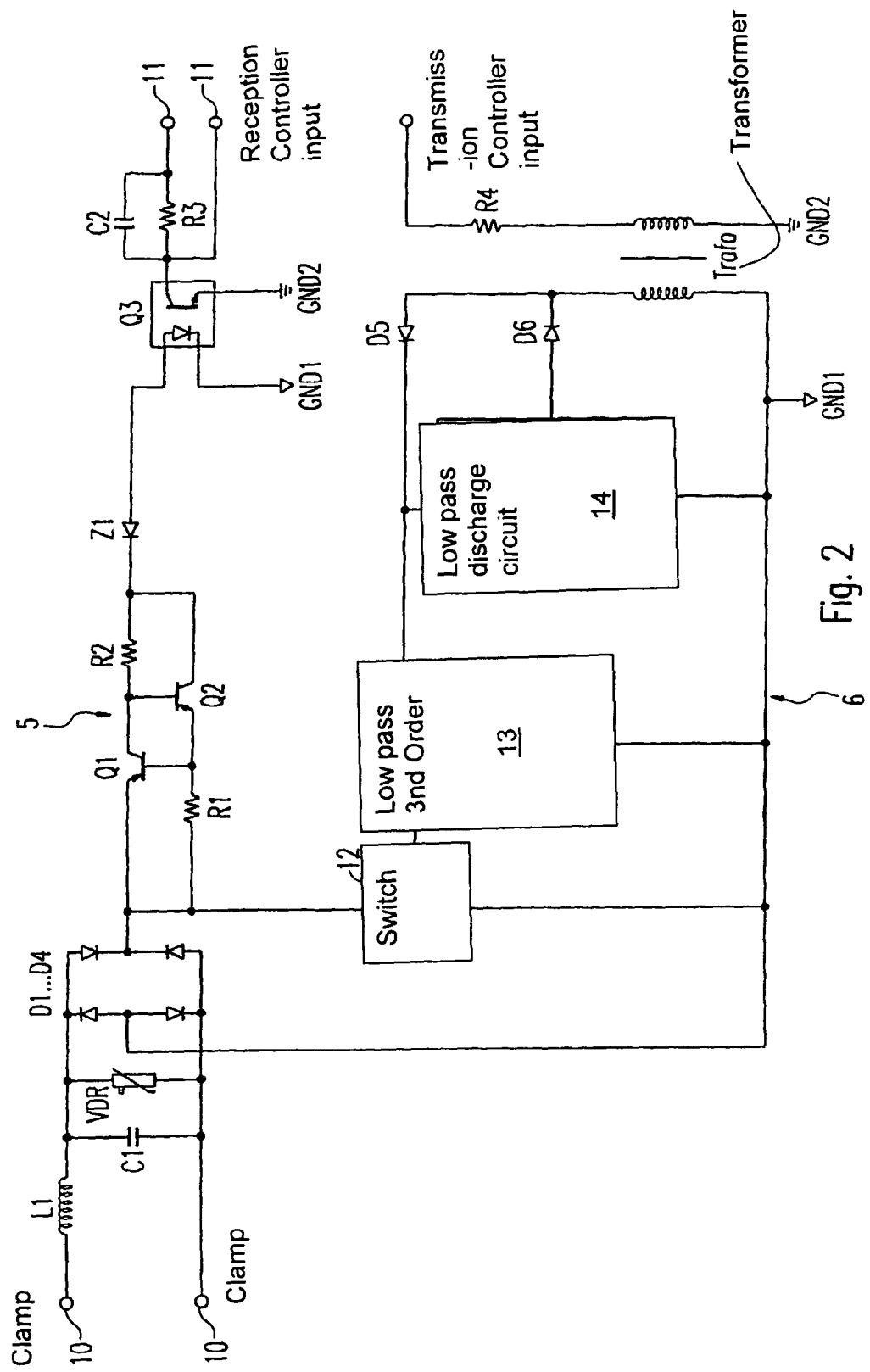
FIG. 2 a possible configuration of the bidirectional interface according to the invention.

A possible configuration of the transmission and reception branch as well as the elements for electrical decoupling is represented in FIG. 2. An unusual feature of the circuit represented in FIG. 2 consists in that the control of the transmission branch is effected via a transformer—not, as usual in the case of to-date known bidirectional interfaces, via an optical coupling device. As is explained in more detail below, this configuration brings about special advantages with regard to the possibilities for data transmission. It has to be said that the invention is however under no circumstances restricted to the configuration of a bidirectional interface specifically represented in FIG. 2. Significant for the realization of the present invention is solely that the reception branch is able at the same time to read and evaluate the signals issued onto the bus lines by the transmission branch.

The interface represented in FIG. 2 is a digital bidirectional interface which is connected to the two bus lines of the bus line system via two clamps 10 and on the input side has firstly a damping network consisting of an inductance Li, a capacitor Cl as well as a voltage dependent resistance VDR. The function of this network resides in damping transients which occur on the bus lines; that is, very short, fast and strong voltage and current changes. This is required since the interface is to be connectable also to the normal mains voltage line and should have an electric strength of up to 1000 volts.

A rectifier including four diodes D1 to D4 follows the damping network, the function of which rectifier is in principle to pass on the signals applied at the two terminal clamps 10 in the same way so that a connection of the two clamps 10 to the lines of the bus line system can be carried out in any desired manner.

The reception branch 5 of the interface has in the following a circuit arrangement of two transistors Q1 and Q2 as well as two resistances R1 and R2, the task of which is restricting the current strength of the received signal passed on to the optical coupling device Q3 to a value of at most 2 mA. This corresponds to the specifications according to the DALI standard. Via a diode Z1 the signals are then passed on correspondingly to the optical coupling device Q3, which serves as element for electrical decoupling and finally passes on the signals via a parallel circuit consisting of a capacitor C2 and a resistance R3 to two output terminals 11 which connect the reception branch of the interface to the controller.

For the transmission of signals on the bus lines, till now, with classic interfaces, an optical coupling device was also provided, which due to an extreme temperature drift of the so-called Current Transfer Ratio (CTR) is only poorly suitable for adhering to the required tolerance limits for the predetermined bit times. Another problem of an optical coupling device consists in the fact that this has a too low overvoltage strength.

In the case of the circuit arrangement represented in FIG. 2 there is correspondingly now used as element for electrical decoupling a transformer which controls a switch 12 for the production of the digital signals at the terminal clamps 10. The advantage of the employed transformer consists in that this can transfer the energy for control of the switch 12 and the energy does not have to be taken from the interface.

Due to the special configuration the rise time and fall time of the flanks of the bus signal can be set virtually independently of each other. This has the consequence that the quality of the signal thereby achieved is improved decisively, which relates both to the tolerance of the bit times and the uniformity of the flanks.

The production of digital signals at the terminal clamps 10 is then carried out as follows:

For the production of a bit signal the transformer is controlled with a high-frequency, and to be more precise with a frequency which corresponds approximately to 100 times the desired bit time. In other words there is effected at the primary winding of the transformer, during the transmission time of an individual bit, a voltage change approximately 100 times, which is passed on to the secondary winding.

The high-frequency alternating voltage applied at the secondary winding of the transformer has the consequence that a low pass of 2nd order 13 upstream of the switch 12 is charged, which in turn results in that the switch 12, which is a field effect transistor, is switched conducting and correspondingly a bit signal is generated.

The low pass of 2nd order 13 is connected to a low pass discharge circuit 14 which permanently tries to discharge the low pass of 2nd order 13 again. As long as the transformer is high-frequency operated, though, this is prevented by the two diodes D5 and D6. Only at the time at which a high-frequency signal is no longer applied on the primary side of the transformer, can the low pass discharge circuit 14 discharge the low pass of 2nd order 13 until by reason of this the switch 12 again opens and correspondingly a rising signal flank is generated for the ending of the bit signal.

Significant for the invention is that a bit signal generated in this way is also received at the same time via the reception branch 5 of the bidirectional interface and monitored by the controller 3. There is now the possibility that the controller 3 evaluates this signal and—so far as necessary—carries out corresponding corrective actions. This will be explained below with reference to the example of a correction of the realized bit time.

Figure 3:
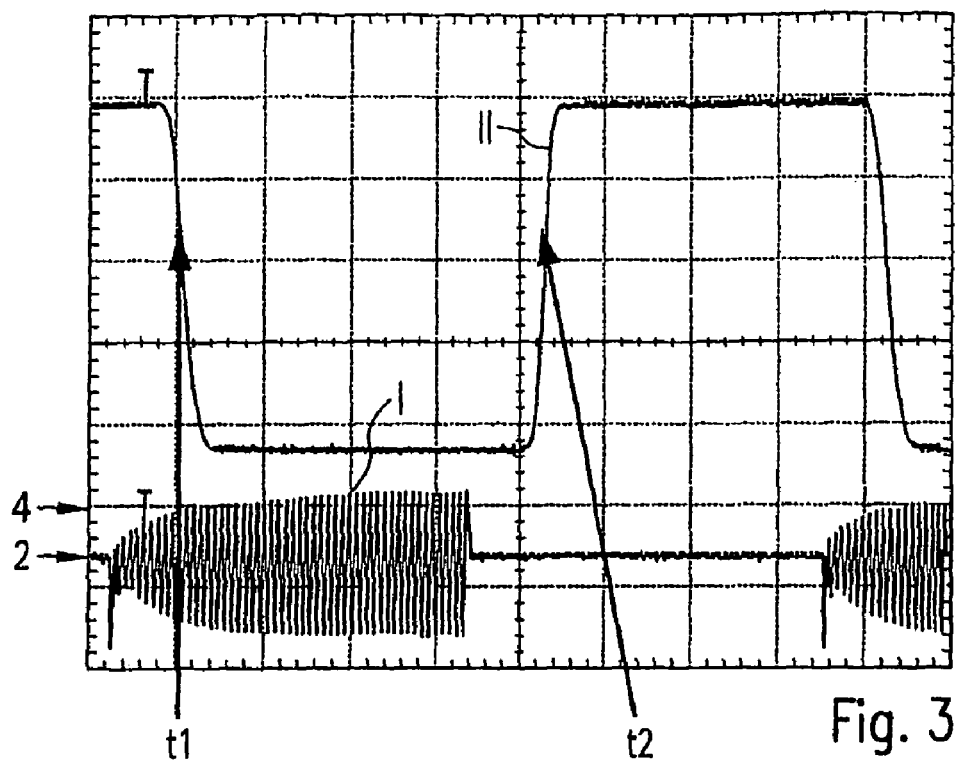
FIG. 3 a first variant of correction of bit time in accordance with the invention and FIG. 4 a second variant of a bit time correction according to the invention.

Thereby FIG. 3 first shows a first exemplary embodiment, whereby there is schematically illustrated the signal 1 applied to the transformer as well as the consequently arising bus signal 11 at the terminal clamps 10.

The monitoring and if applicable required correction of the bit time is now effected in accordance with the first variant by determination of the actual bit duration of the bus signal 11. With the appearance of a sent flank at the time t1 at the input channel there is then started for example in the controller a timer which measures or counts the time until the appearance of the rising flank at the time t2, that is until the end of the bit signal. In this way the timer finds the concrete period of a bit and calculates the relative bit time error. If this error is outside the permitted tolerance, a correction can be carried out for signals transmitted subsequently, which is effected by software adaptation within the controller.

In this way a correction of signals transmitted later can therefore be effected, whereby it can however be provided that corrective actions are only carried out if the evaluated temporal bit length of the transmission branch shows deviations from the desired value which go beyond a permitted tolerance over a defined time period.

A disadvantage of this first variant consists in that in the event that the error measured at first is larger than the permitted tolerance, until the correction is effective at least one bit outside the permitted limits will be transmitted and correspondingly the complete transferred protocol is affected by error. To avoid this, it is correspondingly required with the first variant to transmit a test signal or a test protocol in order to be able to carry out possibly required corrections.

Figure 4:
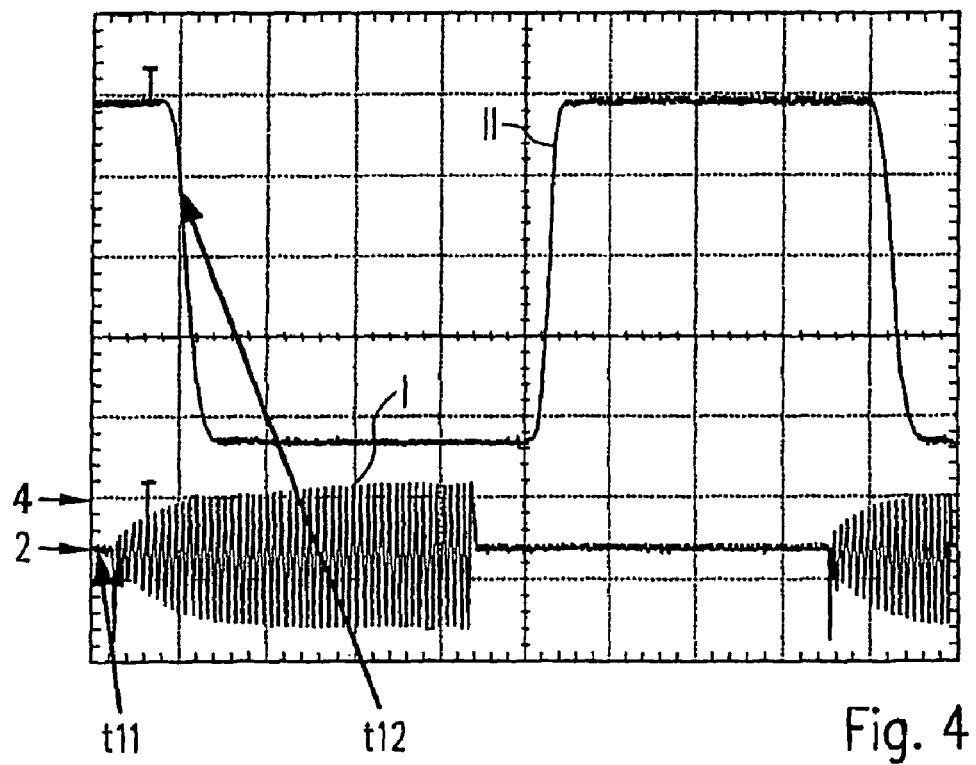

This difficulty are avoided with the second exemplary embodiment illustrated in FIG. 4, in which not the actual time of a sent bit is determined but the delay of a signal issued by the controller with respect to the bit signal arising on the bus lines is determined. Here, it is prerequisite that the delay of the rising and falling flanks, from the controller to the bus, is in an approximately constant relationship.

With the second exemplary embodiment the timer is therefore started at a time t11, at which a start signal is issued by the controller for operating the transformer. As soon as after that the falling flank appears at the terminals at the time t12, the timer is stopped again. The time measured is then if applicable multiplied by the factor which describes the relationship of the delay between falling and rising flanks and the value calculated from this added to the originally predetermined time. The counter for the bit time is then newly loaded with this calculated value and started.

If for example for a bit time of 416 μsec a timer load value of 216-416=65119 (16 bit up-timer, clock frequency 1 μsec) is needed, the timer is first loaded with this value and therewith the first (falling flank) issued. With the appearance of the flank on the bus at the time t12 the timer value is stopped and the counting steps carried out up to now are determined (current timer value-start value). This difference value is now multiplied (insofar as this is required) with the factor mentioned above, added to the start value and the counter newly started with this value. If the counter now reaches the final value, then further control of the transformer is stopped automatically, which has the consequence that rising flank of the bus signal arises substantially at the ideal time point, i.e. the bit signal generated hereby has exactly the prescribed length.

The advantage of this second approach consists in that also the first bit is already issued with the correct length and correspondingly no previous comparison or transmission of a test signal is required. In other words the bit length is always issued correctly.

Again, it is to be emphasized at this point that the invention is not restricted to generating the bit signal with aid of the transformer. Instead the corresponding delay values can of course be determined also with a control by means of an optical coupling device.

Therefore the invention allows the realization of an optimal monitoring of the transmitted signals and if applicable the carrying out of corrective actions without greater outlay in terms of hardware in bidirectional interfaces.

The invention claimed is:

1. Method for operating a bidirectional interface, the method comprising:
monitoring transmissions in a transmission branch of a bidirectional interface comprising a transmission branch and a reception branch connected to the transmission branch;
sending information by means of the transmission branch;
evaluating defined characteristics of the sent information via the reception branch of the same interface; and
setting parameters of the transmission branch as a function of the sent parameters dependent upon the result of the evaluation, so that future information is sent out with use of these parameters.

2. Method according to claim 1, wherein the interface is a digital interface.

3. Method according to claim 2, wherein the defined evaluated characteristics include the temporal bit length of the sent information.

4. Method according to claim 3, comprising determining the temporal bit length by starting a counter at a first flank and stopping the counter at a following flank.

5. Method according to claim 3, comprising determining the temporal bit length starting from a temporal difference between the input of the start flank of the bit into the interface and a passing on of this start flank on a connected bus measured by means of the reception branch.

6. Method according to claim 3, comprising, as a function of the length evaluated via the reception branch setting the bit length of following transmissions, as a parameter of the transmission branch by software.

7. Method according to claim 3 comprising changing parameters of the transmission branch only if the evaluated temporal bit length of the transmission branch shows deviations from a desired value which go beyond a permitted tolerance over a defined time period.

8. Method for operating a bidirectional interface, the method comprising:
monitoring the temporal bit lengths in a transmission branch of a bidirectional digital interface comprising a transmission branch and a reception branch connected to the transmission branch;
sending digital information by means of the transmission branch, evaluating temporal bit lengths of the sent information via the reception branch of the same interface; and in the event that the evaluated temporal bit lengths, over a defined time period, deviate from a desired value by more than a permitted tolerance, effecting a correction of the bit length in the transmission branch.

9. A computer-readable storage medium having computer-executable instructions for implementing a method in accordance with claim 1 when the computer-executable instructions are executed on a computing device.

10. A controller for a bidirectional interface, the controller comprising a processor and a computer-readable storage medium having computer-executable instructions for execution on the processor and for implementing a method for operating a bidirectional interface, the computer-executable instructions comprising instructions for:

monitoring transmissions in a transmission branch of a bidirectional interface comprising a transmission branch and a reception branch connected to the transmission branch;

sending information by means of the transmission branch;

evaluating defined characteristics of the sent information via the reception branch of the same interface; and setting parameters of the transmission branch as a function of the sent parameters dependent upon the result of the evaluation, so that future information is sent out with use of these parameters.

11. Bidirectional interface, comprising:

a transmission branch for transmitting signals via a bus, a reception branch for receiving signals from the bus, wherein the reception branch is connected to the transmission branch in such a way that signals transmitted by the transmission branch can also be read via the reception branch, and a control unit, which evaluates, via the reception branch, signals transmitted via the transmission branch in order to control defined properties of these signals, wherein the control unit is configured to set parameters of the transmission branch dependent upon the result of the evaluation.

12. Interface according to claim 11, wherein the interface is a digital interface.

13. Interface according to claim 11, wherein the defined evaluated characteristics include the temporal bit length of the sent information.

14. Interface according to claim 12, wherein the control unit is configured, depending on the bit length evaluated via the reception branch, to set the bit length of following transmissions, as parameter of the transmission branch.

15. interface according to claim 11, wherein the control unit is configured to change parameters of the transmission branch only if the evaluated temporal bit length of the transmission branch shows, over a defined time period, deviations from a desired value, which go beyond a permitted tolerance.

16. Bidirectional digital interface comprising:

a transmission branch for sending signals via a bus, a reception branch for receiving signals from the bus, wherein the reception branch is so connected with the transmission branch that signals sent by the transmission branch are read via the reception branch, and a control unit which evaluates the temporal bit length of signals sent out via the transmission branch and read via the reception branch and, depending on the result of the evaluation, sets by software the bit length of the transmission branch if the evaluation shows, over a defined time period, a deviation from a desired value beyond a permitted tolerance.

17. Operating device for illumination elements, comprising an interface according to claim 11.

18. Electronic ballast comprising an interface according to claim 11.

19. A computer-readable storage medium having computer-executable instructions for implementing a method in accordance with claim 8 when the computer-executable instructions are executed on a computing device.

20. A controller for a bidirectional interface, the controller comprising a processor and a computer-readable storage medium having computer-executable instructions for execution on the processor and for implementing a method for operating a bidirectional interface, the computer-executable instructions comprising instructions for:

monitoring the temporal bit lengths in a transmission branch of a bidirectional digital interface comprising a transmission branch and a reception branch connected to the transmission branch;

sending digital information by means of the transmission branch, and evaluating temporal bit lengths of the sent information via the reception branch of the same interface; and in the event that the evaluated temporal bit lengths, over a defined time period, deviate from a desired value by more than a permitted tolerance, effecting a correction of the bit length in the transmission branch.

21. Operating device for illumination elements, comprising an interface according to claim 16.

22. Electronic ballast comprising an interface according to claim 17.

\* \* \* \* \*